F. M. SMITH.
Hog-Catcher.

No. 201,205.  Patented March 12, 1878.

WITNESSES:
Francis McArdle.
J. H. Scarborough.

INVENTOR:
F. M. Smith
BY Munn & Co
ATTORNEYS.

UNITED STATES PATENT OFFICE.

FREDRICK M. SMITH, OF VERMILLION, DAKOTA TERRITORY.

IMPROVEMENT IN HOG-CATCHERS.

Specification forming part of Letters Patent No. 201,205, dated March 12, 1878; application field November 10, 1877.

*To all whom it may concern:*

Figure 1:
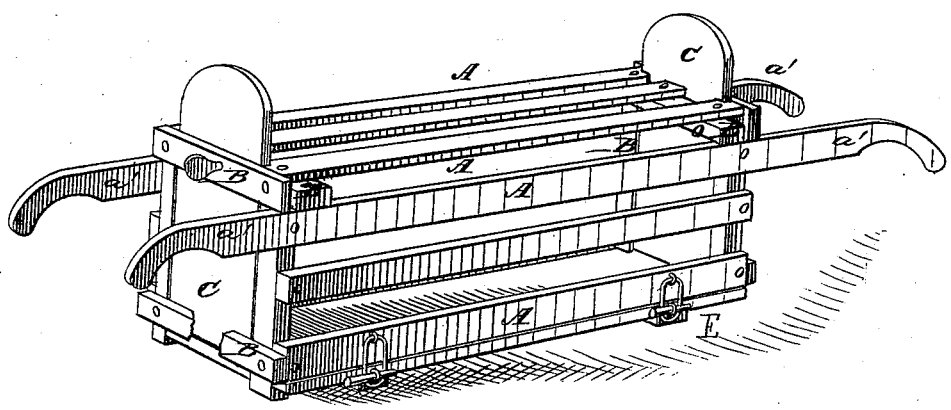
Figure 2:
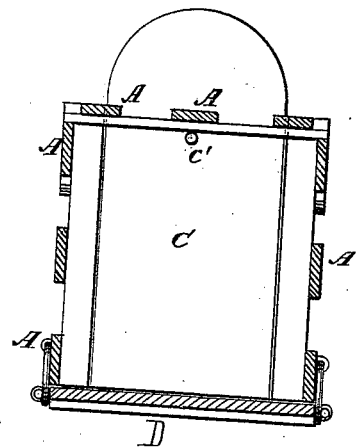

Be it known that I, FREDRICK M. SMITH, of Vermillion, in the county of Clay and Territory of Dakota, have invented a new and useful Improvement in Hog-Catchers, of which the following is a specification:

Figure 1 is a perspective view of my improved hog-catcher, and Fig. 2 is a cross-section of the same.

Similar letters of reference indicate corresponding parts.

The object of this invention is to furnish an improved device for catching hogs and transferring them from one place to another, weighing them, putting them in and taking them out of a wagon, and which shall be simple in construction and convenient in use.

The invention consists of a portable hog-catcher, formed by the combination of a box or cage having a detachable bottom, sliding ends or doors, and handles for transporting the device, as will be hereinafter more fully described.

A are longitudinal slats, attached at their ends to end frames B, to form the sides and top of the catcher. The end boards C slide up and down in ways in the end frames B, and are secured in place, when lowered, by pins $c'$, passed through them beneath the top bars of the frames B. The ends $a'$ of the upper side bars A project, to serve as handles for carrying the device. The bottom board D is loose, and is secured to the lower side bars A by links, staples, and keys E, so that it can be readily attached and detached.

In using the device, the bottom D is detached, two men take hold of the handles $a'$, lower the device over the hog to be caught, walk him over the bottom D, secure said bottom in place, and the hog can be carried from one place to another, put into and taken out of a wagon, or weighed, without touching the hog with the hands, and without injuring him.

When the hog has been conveyed to the desired place, the end door C at his head is raised, and he is allowed to walk out.

Having thus described my invention, I claim as new and desire to secure by Letters Patent—

The portable hog-catcher herein described, consisting of a cage or box having a detachable bottom, sliding end panels or doors, and transporting-handles, as and for the purpose set forth.

FREDRICK MORTON SMITH.

Witnesses:
WILLIAM EVERETT,
JASON D. FARR.